3,362,253
TENSION-TORSION TIE-BAR AND END
FITTINGS THEREFOR
Richard J. Ditlinger, South Bend, Ind., assignor to The Bendix Corporation, a corporation of Delaware
Filed Mar. 9, 1966, Ser. No. 532,990
3 Claims. (Cl. 74—579)

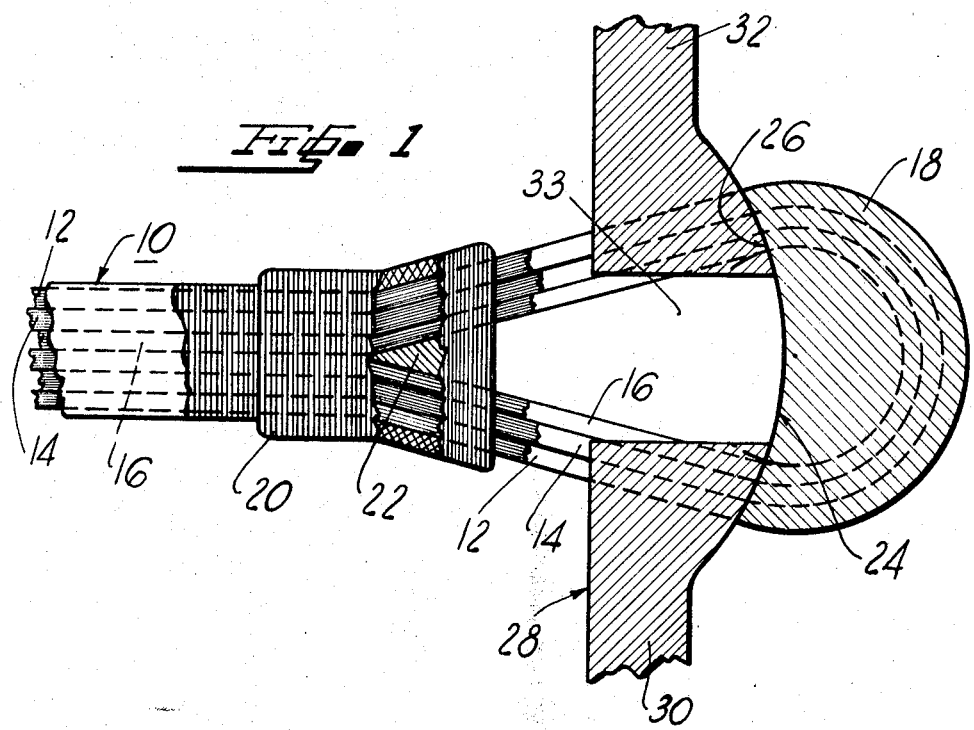
Fig. 1
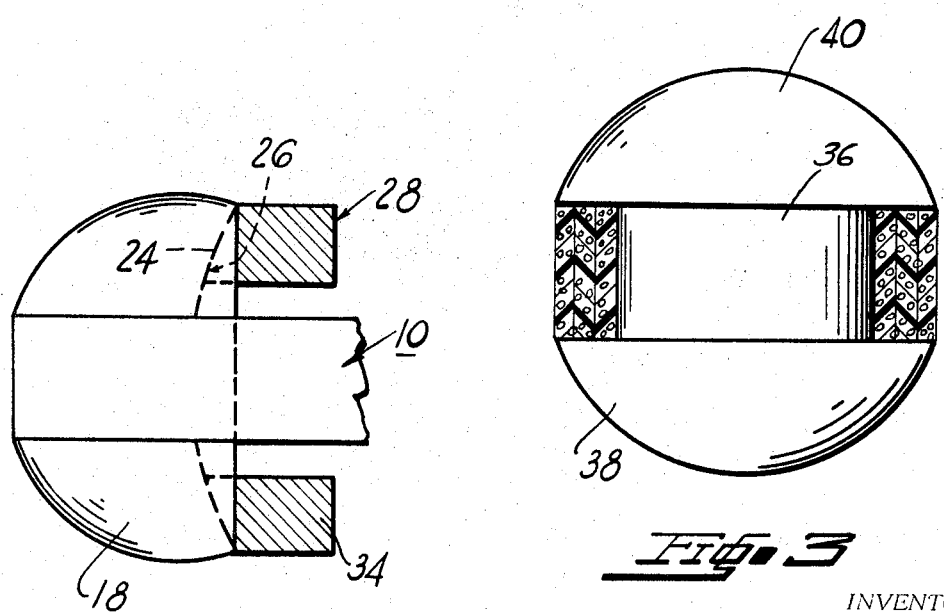
Fig. 2
Fig. 3
INVENTOR.
RICHARD J. DITLINGER
BY
Richard G. Geib
ATTORNEY

United States Patent Office 3,362,253
Patented Jan. 9, 1968

ABSTRACT OF THE DISCLOSURE

An end fitting arrangement for a coupling between structures having a spherical bushing with a spherically concave surface for abutting connection with spaced ball surfaces so that tensile loading of the coupling will draw said ball surfaces in along said spherically concave surface in contrast to prior art devices which arrange such ball and socket connections with the ball acting as a wedge to brake free of the socket under abnormal loading.

Summary

Couplings of the nature set forth by this invention are being utilized in connecting helicopter rotor arms to helicopter rotor blades such as is seen in Patent Nos. 3,228,-481 and 3,265,554 assigned to the common assignee of this invention, and manufactured, generally speaking, from tapes of wire or glass filaments as described in the U.S. Patent No. 3,189,510 also assigned to the common assignee. However, in these prior art inventions it has been taught that a round pin be the connection between bushings at each end of the coupling and the surrounding structure of the arm or blade. This invention improves upon these prior art teachings by providing a means to directly engage the surrounding structure via the bushings at each end of the coupling, and thus, do away with the need for separate pins to unite the structures via the coupling.

This invention relates to improvements in tie-bar construction.

More particularly this invention relates to a tie-bar having end bushings of a design that reduces the number of stress concentration points therein.

It is another object of this invention to provide a tie-bar with bushings that incorporate a spherically concave socket surface through which a tensile load is transmitted by mating load bearing structures having a ball surface for direct bearing with the bushings.

A still further object of this invention is to provide a tie-bar formed of an endless structure of filament laminations having a multiplicity of parallel filaments spaced one from the other by an elastomeric substance with a means for connecting to load bearing structures that eliminates the need for pins.

Other objects and advantages of this invention will appear from the following description of the drawings in which:

FIGURE 1 is a cross sectional plan view of the right end of a tie-bar connected to a load bearing structure in accordance with the principles of my invention;

FIGURE 2 is a side view of the left end of the tie-bar of FIGURE 1 with the load bearing structure in partial cross section above and below an end bushing; and FIGURE 3 is an end view of the bushing for the tie-bar without the filament laminations therearound.

With more particular reference to FIGURE 1 there is shown a tie-bar 10 having laminations 12, 14 and 16 wrapped about a bushing 18, which has a similar bushing at the other end of the coupling. As seen, each of the laminations are gathered together by a circular wrap of similar filaments, as at 20, which circular wrap is held from sliding down the tie-bar 10 by means of the inclusion of a wedge 22, held in place by the circular wrap 20 at the point where the laminations 12, 14 and 16 are gathered together.

As seen, the bushing 18 is formed with a spherically concave surface 24 that mates with a ball surface 26 of a load bearing structure 28. The load bearing structure 28 is shown to be split to thereby have two similar ball surfaces with legs 30 and 32 radiating therefrom. These legs may be affixed to surrounding structure or be integral therewith as the situation may dictate. The slot 33 between the legs is of a dimension to allow the tie-bar 10 to pass through and be pulled until bushing 18 abuts legs 30 and 32.

As can be seen in FIGURE 2, it may well be desirable to provide a similar load bearing structure 34 below the tie-bar 10 depending upon the loads that are to be in the associated system.

With regard to FIGURE 3, the bushing 18 is shown to have a cavity 36 formed between spherical heads 38 and 40. The cavity 36 is appropriately sized to receive the laminations 12, 14 and 16 of the tie-bar 10; i.e., the height and depth of the cavity 36 is chosen so that the resulting endless structure formed by the tie-bar wrapping around the bushings will provide a smooth outer profile.

As mentioned in the above objects, the end bushings, being spherical in shape, reduce the number of stress concentration points, and, as the bushings incorporate a spherically concave socket surface 26, the tensile load from the load bearing structures 28 is transmitted to the bushings 18 via direct bearing therewith. In prior art systems the bushings 18 have been drilled to allow for a pin connection to similar load bearing structures as the structures 28. It has been proven by the particular ball and socket configuration of this invention that the bearing area of the bushing for load transmittal is roughly 25% less than with a pin-type retention. This bushing designed also provides extremely rugged and non-deflecting flanges to thereby maintain a stable cavity 36. If it were otherwise, the loading and unloading of the filaments in the filament laminations would permit fretting of the filaments within their elastomeric shells that will lead to premature tie-bar failure.

This new and novel method of load transmission provides a destinct merit over the prior art type ball and socket connections which require split members for assembly, where the socket is split. In such prior art construction the ball socket then acts as a wedge and tends to force apart the socket portion supporting it. In this invention, however, the spherically concave surfaces of the bushings tend to hold the split mating ball portions 26 together. A distinct advantage in this is in the stable equilibrium created when forces in the load bearing structures are stabilized by reactive forces in the bushing that will deflect the sides of the split ball surfaces 26 together. It should also be noted that the ball socket type connection provided by this invention means that the tie-bar is self-aligning which will reduce bending loads thereon. Furthermore, as the connection for the tie-bar to the load bearing structures is outboard of the cavity for the filament laminations, any twisting of one of the load bearing structures at one end of the coupling with respect to the load bearing structure at the other end of the coupling acts on upper and lower heads 40 and 38 to cause a bending moment that tends to close the cavity 36 at the rear of the bushings. If at the same time one of the load bearing structures 28 is being loaded so as to create tension in the tie-bar it will in turn create a tensile load on the filaments within the cavity that is reactive in an opposite direction so that there are two forces which tend to cancel each other.

Having fully described a method of construction of the tie-bar in accordance with the principles of my invention having in mind the objects and advantages it presents over the known prior art, I wish to now set forth the scope of my invention by the appended claims.

I claim:

1. In a coupling formed by a lamination of filament layers bonded in an endless structure with multiple filaments in each layer parallel to and separated from each other by an elastomeric substance, a means to connect said endless structure between load bearing elements, said means comprising:

a ball surface on each load bearing element; and at least two bushings each of which has an intermediate cavity within which said endless structure is attached, said bushings having a socket surface contoured to mate with said ball surface to transmit tensile loadings from one load bearing element to the other, said socket surface having portions above and below said cavity to provide a moment arm for said load bearing element with respect to said endless structure so as to balance the bending moments on the bushings against the tensile loading in the endless structure.

2. The structure according to claim 1 wherein said ball surface is slit to provide separate portions and said socket surface portions are spherically concave so that reactive forces in said bushings prevent further spreading of the separate portions of the ball surface.

3. The structure according to claim 1 wherein the cavity for receiving said endless structure is between radial flanges, said socket surface being defined by a spherical profile on said flanges, said socket surface facing inwardly towards the center of said coupling such that said ball surface on said load bearing member mates therewith in a direction away from said center so that said endless structure is in tension when loads are being applied by the load bearing elements in said direction.

References Cited

UNITED STATES PATENTS

| | | | |
|---|---|---|---|
| 1,829,306 | 10/1931 | Sneed | 74—579 |
| 2,302,198 | 11/1942 | Ehmann | 24—123.1 X |
| 3,228,481 | 1/1966 | Eldred | 170—160.53 |
| 3,265,554 | 8/1966 | Eldred | 24—265 |
| 3,279,278 | 10/1966 | Eldred | 74—579 |

OTHELL M. SIMPSON, *Primary Examiner.*

WILLIAM FELDMAN, *Examiner.*

G. WEIDENFELD, *Assistant Examiner.*